United States Patent [19]

Vanderlinden et al.

[11] Patent Number: 4,644,810
[45] Date of Patent: Feb. 24, 1987

[54] CONICAL DRIVE

[75] Inventors: Roy E. Vanderlinden, Frederick, Md.; John H. Francis, Charles Town, W. Va.

[73] Assignee: Frederick Manufacturing Company, Frederick, Md.

[21] Appl. No.: 691,862

[22] Filed: Jan. 16, 1985

[51] Int. Cl.[4] .................. F16H 13/02; F16H 15/00; F16H 1/02
[52] U.S. Cl. ........................... 74/191; 74/206; 74/190; 74/412 TA
[58] Field of Search ............. 74/191, 206, 772, 798, 74/796, 192, 193, 180, 412 TA; 464/42, 43, 45, 46

[56] References Cited
U.S. PATENT DOCUMENTS

| | | | |
|---|---|---|---|
| 200,345 | 2/1978 | Rushworth | 464/42 |
| 2,049,024 | 7/1936 | Robertson | 464/42 |
| 2,652,135 | 9/1953 | Flaton | 464/43 |
| 3,158,041 | 11/1964 | Rae | 74/193 |
| 3,207,004 | 9/1965 | Chery | 74/772 |
| 3,388,607 | 6/1968 | Stober et al. | 74/191 |
| 3,630,095 | 12/1971 | Eakin | 74/191 |
| 3,648,483 | 3/1972 | Garcia, Jr. | 464/43 |
| 4,180,990 | 1/1980 | Hill | 464/42 |
| 4,459,840 | 7/1984 | Francis | 72/452 |
| 4,466,303 | 8/1984 | Stober | 74/191 |
| 4,515,028 | 5/1985 | Vanderlinden et al. | 74/190 |

FOREIGN PATENT DOCUMENTS 0107388 5/1984 European Pat. Off. ............. 74/796

OTHER PUBLICATIONS

"Traction Drives" F. Heilich III et al., pp. 160–161, (1983).

Primary Examiner—Lawrence Staab
Assistant Examiner—Michael Bednaret
Attorney, Agent, or Firm—Millen & White

[57] ABSTRACT

Conical drives for changing the speed of an output shaft relative to an input shaft include a conical coupling between the output shaft and a conical driving member within the drive. The output and input shafts are aligned with a first axis and the conical driving member rolls around the first axis without slipping while rotating about a second axis disposed obliquely with respect to and intersecting the first axis at a coincidence point. The apexes of the conical coupling and the conical driving member are coincident with the coincidence point. The conical coupling is utilized with both single and multi-speed drives.

9 Claims, 2 Drawing Figures

CONICAL DRIVE

RELATED PATENTS AND PATENT APPLICATIONS

U.S. patent application Ser. No. 426,874 filed Sept. 29, 1982, now U.S. Pat. No. 4,459,840 issued July 17, 1984.

U.S. patent application Ser. No. 426,875 filed Sept. 29, 1982.

U.S. patent application Ser. No. 480,144 filed Mar. 29, 1983.

U.S. patent application Ser. No. 69,863 filed Jan. 16, 1985.

BACKGROUND OF THE INVENTION

1. Field of the Invention

The instant invention relates to particular types of traction drives utilizing rolling conical surfaces wherein there is no slippage in the drives. More particularly, the instant invention relates to drives utilizing conical surfaces; wherein the apexes of all conical surfaces interacting in the drives are coincident at the same point, and wherein that point is on an axis with which input and output shafts of the drives are aligned.

2. Technical Considerations and Prior Art

Applicants' prior applications, U.S. patent applications Ser. No. 426,875; 480,144 and 69,863 disclose the concept of utilizing a non-slipping, conical transmission member in a single speed drive, a multispeed drive and a variable speed drive, respectively. The drives disclosed in these patent applications have numerous advantages over conventional gear drives and other types of transmissions such as conventional traction drives and drives which rely on belts and cones. However, each of the drives disclosed in these patent applications utilize a Cardin constant-velocity joint which has certain disadvantages and inherent inefficiencies. These disadvantages and inefficiencies are not so great as to negate the advantages and efficiencies provided by the drives disclosed in these patent applications, however, none the less, they do exist. Constant-velocity joints generally comprise two Hooke's joints connected together so that a loss in velocity caused by one Hooke's joint is compensated for by a gain in velocity caused by the second Hooke's joint. This loss of velocity and compensation creates a net loss in energy transfer of the system. In addition, constant velocity couplings generally require lubrication and can cause maintenance difficulties.

SUMMARY OF THE INVENTION

It is a feature of the instant invention to provide a new and improved coupling between a conical member driven by an input shaft and an output shaft of a non-slipping traction drive.

In accomplishing this feature, the instant invention contemplates a non-slipping traction drive having an input shaft and an output shaft aligned on a first axis. The input shaft is connected to a member having a conical surface thereon, which conical surface has an axis of rotation aligned with a second axis, which second axis is disposed at an angle to the first axis. The conical member is rotatable with respect to the input shaft and has first and second conical surfaces thereon. The first conical surface rolls without slipping on a stationary conical surface and is complimentary to a conical surface on the output shaft. As the conical member rolls on the stationary conical surface, it revolves about the first axis and rotates around the second axis thereby driving the output shaft through engagement with the conical surface on the output shaft.

In accordance with another embodiment of the invention, the conical member has a plurality of conical surfaces thereon, each of which has a complementary, stationary conical surface upon which it can selectively roll. The selection of a stationary surface is made by either rendering a complementary conical surface stationary with respect to the conical member and input shaft or by bringing a stationary surface into engagement with a complementary conical surface on the conical member.

In accordance with one embodiment of the multispeed drive, the conical member is surrounded by a plurality of annular members having conical surfaces thereon which are free to rotate in a housing surrounding the conical member. Brake means are provided to selectively prevent rotation of one of the annular members so as to cause the conical member to roll thereon while the other annular members spin. In accordance with another embodiment of the invention, the annular members are axially shifted into engagement with a conical surface on the conical member in order to cause the conical member to roll thereon.

DESCRIPTION OF THE PREFERRED EMBODIMENTS

Figure 1:
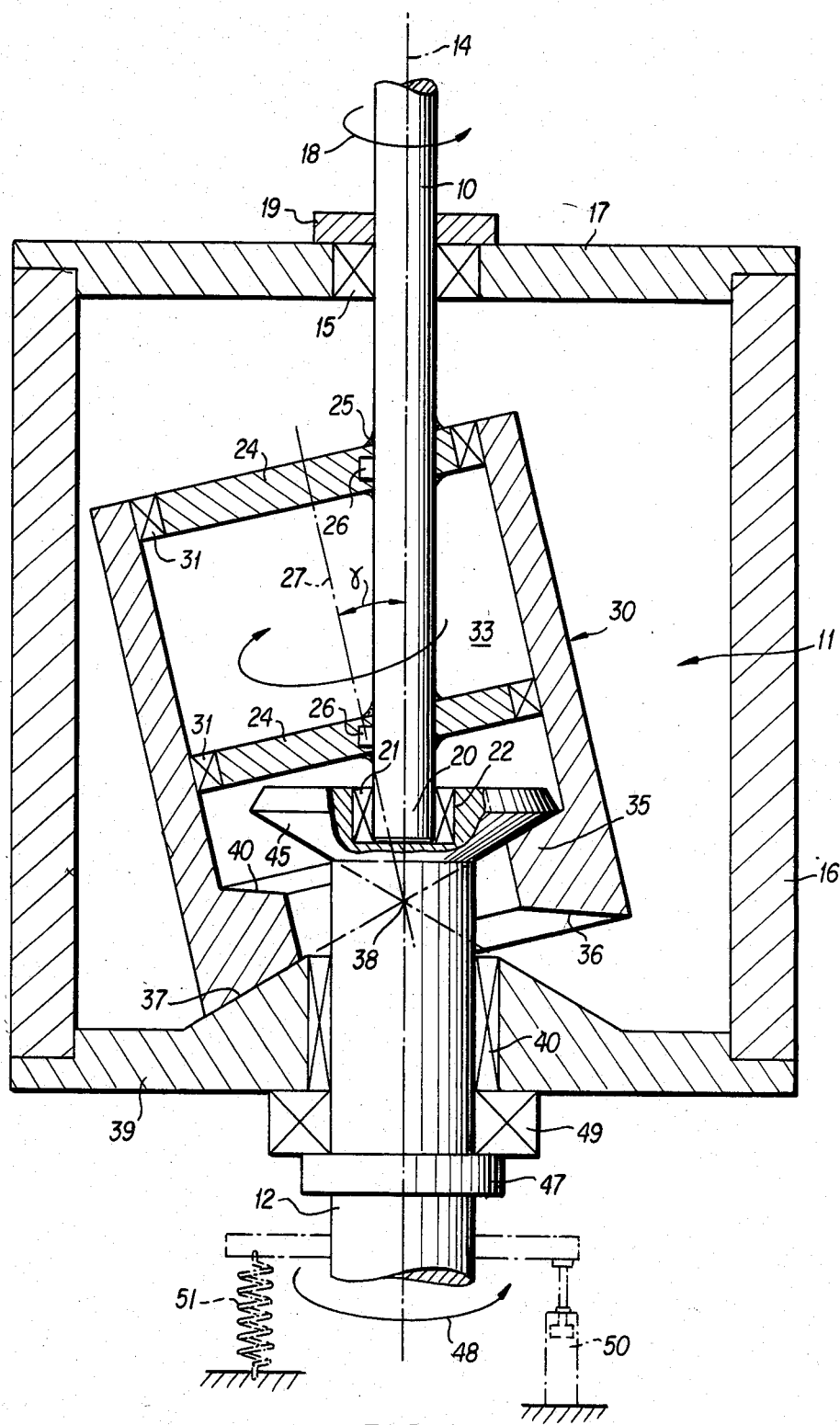
FIG. 1 is a side view, in section, with portions cut away, showing a single speed embodiment of the instant invention.

Referring now to the drawings, FIG. 1 shows a single speed embodiment of the invention wherein the input speed and input torque on an input shaft 10 is altered by a conical drive, designated generally by the numeral 11, to produce a different speed and different torque on an output shaft 12. The input shaft 10 and output shaft 12 are axially aligned with a first axis 14. The conical drive 11 is contained within a housing 16 which is preferably held stationary with respect to the input shaft 10 and output shaft 12 both of which rotate with respect to the housing.

The input shaft 10 is journaled in a top plate 17 of the housing 16 by a bearing 18. For purposes of this discussion, the imput shaft is driven to rotate in the direction of arow 15 (although the input shaft 10 may rotate in either direction). The input shaft 10 is restrained from movement in an axial direction by collars 19. In accordance with a preferred embodiment, the input shaft 10 has its free end 20 stabilized by being journaled in a bearing 21 seated in a bore 22 in the output shaft 12. Between its free end 20 and the collar 19, the input shaft has a crank plates 24 secured rigidly thereto by welds 24 and keys 26. The plates 24 are circular in configuration about a second axis 27 which forms an angle $\gamma$ with respect to the first axis 14 and intersects axis 14. As is readily seen in the drawing, the circular crank plate 24 is mounted eccentrically on the input shaft 14 and obliquely with respect to the first axis 14 so as to create the angle $\gamma$.

A conical driving member, designated generally by the numeral 30 is journaled by bearings 31 to rotate on the crank plate 24 about the second axis 27. the conical driving member is substantially hollow and difines a space 33 which receives a portion of input shaft 14 and a portion of the output shaft 12. The conical driving member 30 has an inwardly projecting annulus 35 disposed at the end thereof opposite circular crank plate 24. The annulus 35 has a first conical track 36 thereon which engages a complementary conical track 37 formed on an end plate 38 jof the housing 16. The conical track 37 is annular and has a bore therethrough which accommodates output shaft 12. Both the conical track 37 is annular and has a bore therethrough which accommodates output shaft 12. Both the conical track 37 and conical 36 define right cones which each have an apex 38, which apex is coincident with the same point that the second axis 27 intersects the first axis 14.

Accordingly, the conical driving member 30 rolls on the stationary conical surface 37 as the input shaft 10 rotates circular crank plate 24. Since the crank plate 24 is obliquely mounted on input shaft 10, the conical driving member 30 appears to wobble about the first axis 14 as it rotates on circular crank plate 24 about the second axis 27. Since conical surfaces 36, 37 have apexes 38 which coincide with the intersection point of first axis 14 and second axis 27, there is ordinarily no slippage between conical surfaces 36 and 37. Rather, there is pure rolling motion.

The annulus 35 has a second track 40 facing the space 33 defined within the conical driving member 30. The conical track 40 also has its apex at point 38. A conical track 45 is rigidly connected to the end of output shaft 12 and is held in engagement with the conical track 40. The apex of the conical track 45 coincides with point 38, which is the point of intersection of the first and second axes 14 and 27 and the apex of conical surfaces 36 and 37. As surface 36 of conical member 30 rolls on fixed surface 37, the conical surface 40 of the conical drive member 30 drives conical surface 45 to rotate around the axis 14 and thus rotates the output shaft 12. In the embodiment of FIG. 1, the output shaft 12 rotates in the direction of arrow 48 which is in the same direction as the direction of shaft 10 represented by arrow 18.

During operation the drive 11 does not slip. In other words the surfaces 45-40 and 36-37 roll on one another with substantially pure line contact and no slippage.

The force with which the conical surfaces 40-45 and 36-37 engage one another may be determined in a number of ways. In the embodiment shown in FIG. 1, this force is selected by a collar 47 which can be positioned against a thrust bearing 49 to apply a predetermined force between the conical surfaces. Other approaches may utilize a hydraulic system 50 for applying a force to the shaft 12 or perhaps a spring 51 used for applying an axial force to the shaft 12.

Figure 2:
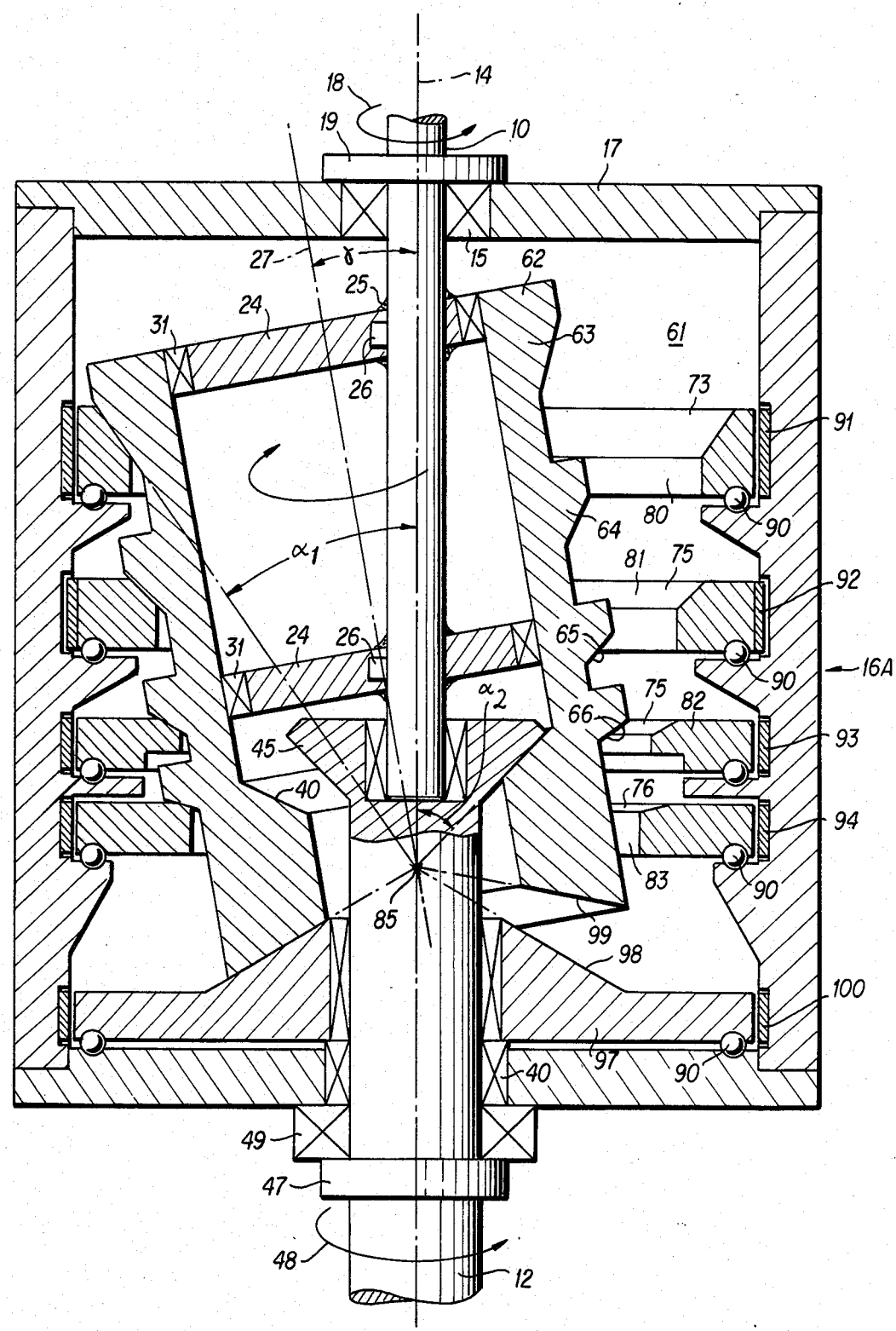
FIG. 2 is a side view, in section with portions cut away, showing a multi-speed drive.

Referring now to FIG. 2, there is shown a multiple speed drive, designated generally by the numeral 61. In the multiple speed drive 61 shown in FIG. 2, parts similar to parts in FIG. 1 have similar reference numerals. The multiple speed drive 61 differs from the single speed drive 11 in that in the multiple speed drive there is a conical member 62 which has a plurality of conical surfaces 63, 64, 65, and 66 thereon, which surfaces selectively roll on complimentary conical surfaces 73, 74, 75 and 76 on a plurality of annular conical members 80, 81, 82 and 83. The apexes of the surfaces 63-66 and 73-76 all intersect the intersection point of the first and second axis 14 and 27 at a point of coincidence 85.

Each of the annular conical members 80-83 are mounted on the housing 16A by bearing 90 and are normally free to rotate. Consequently, the annular members normally rotate as the conical drive member 62 rotates about second axis 27. In order to select a particular speed for the drive 61, one of the annular members 80-83 is prevented from rotating with respect to the housing 16A so as to be stationary with respect to the conical member 63. The conical member 63 will roll on the single annular member 80-83 which is being held stationary with respect to the housing 16A. All other annular members 80-83 are driven by the conical member 63 to rotate within the housing 16A.

The annular members 80-83 are selectively rendered stationary with respect to the housing 16A by tightening one of the bands 91, 92, 93 or 94. In FIG. 2, band 92 is tightened to prevent annular member 81 from rotating while bands 91, 93 and 94 are loose. While bands are shown in the illustrated embodiment, one might stop rotation of an annular member 80-83 with a number of arrangements, such as for example, inserting a stop pin between the housing 16A and the selected annular member. Another approach is to fix the annular members so as to not rotate with respect to the housing 16A, but allow the annular members to be shifted axially with respect to the axis 14 so as to selectively move only one of the annular members into engagement with a surface selected from the surfaces 63-66 of conical drive member 62.

As with the embodiment of FIG. 1, the embodiment of FIG. 2 rotates the output shaft 12 by driving the surface 45 on the output shaft with conical surface 40 on the conical member 63.

In order to provide the multiple speed drive 61 with a reverse, an additional annular member 97 is provided having an annular surface 98 that abutts a corresponding annular surface 99 on the conical drive member 62. As is readily seen from FIG. 2, the annular surfaces 98 and 99 have an angle $\alpha_2$ which is negative. Consequently, the shaft 12 will rotate in the opposite direction from the direction it would rotate in if one of the annular members 80-83 was selected. The annular member 97, which provides the reverse direction, output may be stopped by applying a braking band 100 or may be stopped by utilizing a stop pin (not shown) extending between the housing 16A and the annular member 97. In the alternative, the annular member 97 may be restrained from rotation with respect to the housing 16A and simply moved axially into engagement with the surface 99 when a reverse direction is desired on output shaft 12.

For a transmission such as an automobile transmission, it has been determined that five forward speeds and a reverse might be provided with ratios "R" determined in accordance with the formula:

$$R = \frac{1}{\dfrac{\cos \alpha_1 \cos (\alpha_1 - \gamma)}{\cos \alpha_2 \cos (\alpha_1 + \gamma)} - 1}$$

If $\gamma = 10°$
$\alpha_2 = 45°$
Then:

| For | | R |
|---|---|---|
| 1st | $\alpha_1 = 15°$ | 4.26 |
| 2nd | $\alpha_1 = 20°$ | 3.89 |
| 3rd | $\alpha_1 = 30°$ | 3.23 |
| 4th | $\alpha_1 = 45°$ | 2.33 |

| | -continued | |
|---|---|---|
| 5th | $a_1 = 66°$ | 1.00 |

These particular ratios are not illustrated in FIG. 2. However, they are readily obtainable by using structures such as that suggested by FIG. 2. In addition to five forward speeds and a reverse, the multiple speed transmission 61 could also provide both a "park" wherein the output shaft 12 is locked relative to the input shaft 14 and a "neutral". The park and neutral concepts are set forth in co-pending patent application Ser. No. 480,144 filed Mar. 29, 1983, now U.S. Pat. No. 4,515,028 incorporated herein by reference.

The foregoing examples are merely illustrative of the invention, and the invention is to be limited only by the following amended claims.

What is claimed is:

1. A mechanism for transmitting torque less than a predetermined torque comprising:
    a first shaft;
    means for mounting the first shaft for rotation about a first axis;
    a first bearing surface, the first bearing surface having as a generatrix a radially extending first line intersecting the first axis at a point and rotating about the point through 360° at a constant angle with respect to the first axis;
    a rotatable member having a first conical surface in engagement with the first bearing surface along a line of contact which is coincident with the radially extending straight line which forms the generatrix of the first bearing surface, the conical surface also having an apex which is coincident with the point on the first axis about which the generatrix rotates; the rotatable member further having a second conical surface which is continuously conical, the second conical surface having an apex which is also coincident with the point on the first axis about which the generatrix rotates;
    means for mounting the rotatable member to rotate about a second axis, which second axis is oblique with respect to the first axis and coincident with the axis of the first conical surface, the second axis intersecting the first axis at the point on the first axis about which the generatrix rotates;
    a second shaft;
    means for mounting the second shaft for rotation about the first axis;
    a conical surface on the second shaft, the conical surface on the second shaft being in engagement with the second conical surface on the rotatable member, the conical surface on the second shaft having an apex which is coincident with the point on the first axis about which the generatrix rotates, and
    means for urging the conical surfaces together whereby the conical surfaces do not slip on one another as the first axis is rotated to drive the second axis so long as the torque is less than the predetermined torque.

2. The mechanism of claim 1 wherein the first and second shafts have first and second free ends and wherein means are provided for journalling the free ends of the shafts to one another along the first axis so as to stablize the shafts.

3. The mechanism of claim 2 where the rotatable member defines a space therein which space receives the free ends of the first and second shafts; wherein the second conical surface on the rotatable member faces the space and the conical surface on the second shaft is within the space and abutts the second conical surface, and wherein the first bearing surface is exterior of the space and the first conical surface faces away from the space.

4. The mechanism of claim 3 wherein the first conical surface on the rotatable member and the first bearing surface are sloped in a direction which is opposite in sign to the direction of the second conical surface on the rotatable member and the conical surface on the second shaft whereby the first and second shafts rotate in the same direction.

5. The mechanism of claim 1 wherein the first bearing surface is conical.

6. A multi-speed drive mechanism comprising:
    a first shaft;
    means for mounting the first shaft for rotation about a first axis;
    a rotatable member;
    means for rotatably mounting the rotatable member on the first shaft obliquely with respect to the first axis for rotation about a second axis, which second axis intersects the first axis to define a coincidence point;
    a plurality of first conical surfaces on the rotatable member which conical surfaces have different slopes and have apexes which are coincident with the coincidence point;
    a second conical surface on the rotatable member which conical surface has an apex which is coincident with the coincidence point;
    a plurality of conical bearing surfaces disposed around the first axis with the apexes of the conical bearing surfaces intersecting the first axis; each of the conical bearing surfaces corresponding in slope to one of the first conical surfaces on the rotatable member;
    speed selection means for fixing a selected one of the bearing surfaces in engagement with a corresponding first conical surface on the rotatable member whereby the rotatable member rolls on the selected one of the bearing surfaces;
    a second shaft aligned with the first shaft and first axis;
    means for mounting the second shaft for rotation about the first axis;
    a conical surface on the second shaft in continuous line contact with the second conical surface on the rotatable member and having an apex coincident with the coincidence point; and
    means for holding the conical surfaces in engagement whereby the input shaft drives the output shaft to rotate at a speed and torque determined by which one of the first conical surfaces rolls on the corresponding conical bearing surface.

7. The mechanism of claim 6 wherein one of the first conical surfaces and the corresponding conical bearing surface have equal slopes opposite in sign to the other first conical surfaces and corresponding conical bearing surfaces whereby the mechanism has a "reverse" speed.

8. The mechanism of claim 6 wherein the speed selection means comprises bearing means for holding the bearing members in engagement with the first conical surfaces whereby the bearing members rotate as the rotatable member rotates and means for stopping one of the bearing members, wherein the rotatable member rolls on the stopped bearing member.

9. The mechanism of claim 6 wherein the bearing members are restrained from rotation and are axially slid selectively into engagement with the first conical members one at a time to determine the speed ratio of the second shaft relative to the first shaft.

* * * * *